(12) United States Patent
Moya

(10) Patent No.: US 7,094,469 B2
(45) Date of Patent: Aug. 22, 2006

(54) POROUS OR NON-POROUS SUBSTRATE COATED WITH AN IMMOBILIZED POLYMERIC COMPOSITION HAVING SULFONYL GROUPS AND HYDROPHILIC FUNCTIONAL GROUPS AND PROCESS

(75) Inventor: Wilson Moya, Concord, MA (US)

(73) Assignee: Mykrolis Corporation, Billerica, MA (US)

( * ) Notice: Subject to any disclaimer, the term of this patent is extended or adjusted under 35 U.S.C. 154(b) by 21 days.

(21) Appl. No.: 10/344,058

(22) PCT Filed: Aug. 28, 2001

(86) PCT No.: PCT/US01/26720

§ 371 (c)(1),
(2), (4) Date: Feb. 6, 2003

(87) PCT Pub. No.: WO02/18036

PCT Pub. Date: Mar. 7, 2002

(65) Prior Publication Data

US 2004/0024123 A1 Feb. 5, 2004

(51) Int. Cl.
*B32B 27/08* (2006.01)
*B32B 27/28* (2006.01)
*C08J 5/20* (2006.01)
*C08J 5/22* (2006.01)
*C08F 214/18* (2006.01)

(52) U.S. Cl. .......... 428/421; 428/304.4; 428/305.5; 428/318.4; 428/319.3; 428/319.7; 428/422; 521/25; 521/26; 521/27; 521/29; 521/30; 521/31; 521/32; 521/33; 521/36; 521/37; 521/38; 526/242; 526/243; 526/245; 526/247; 526/248; 526/249; 526/250; 526/251; 526/252; 526/253; 526/254; 526/255

(58) Field of Classification Search .......... 428/304.4, 428/305.5, 318.4, 319.3, 319.7, 421, 422; 521/25, 26, 27, 29, 30, 31, 32, 33, 36, 37, 521/38; 526/242, 243, 245, 247, 248, 249, 526/250, 251, 252, 253, 254, 255
See application file for complete search history.

(56) References Cited

U.S. PATENT DOCUMENTS

| | | | | | |
|---|---|---|---|---|---|
| 4,414,280 | A | * | 11/1983 | Silva et al. | 428/422 |
| 4,487,668 | A | * | 12/1984 | England et al. | 205/520 |
| 4,851,121 | A | | 7/1989 | Yokota et al. | |
| 5,463,005 | A | | 10/1995 | Desmarteau | |
| 5,541,235 | A | * | 7/1996 | Busman et al. | 522/25 |
| 6,090,895 | A | * | 7/2000 | Mao et al. | 525/330.9 |
| 6,156,451 | A | * | 12/2000 | Banerjee et al. | 156/228 |
| 6,576,100 | B1 | * | 6/2003 | Arcella et al. | 204/296 |

FOREIGN PATENT DOCUMENTS

| | | |
|---|---|---|
| WO | WO 99/38842 | 8/1999 |
| WO | WO 02/18036 | 3/2002 |

* cited by examiner

*Primary Examiner*—Vivian Chen
(74) *Attorney, Agent, or Firm*—Timothy J. King; Michael P. Straher; Cozen O'Connor

(57) ABSTRACT

A porous or non-porous polymeric substrate having its surface modified with an immobilized fluorocarbon such as perfluorocarbon, polymeric composition is provided. The immobilized fluorocarbon is formed from a monomer having formula: $[T\text{—}SO_2\text{—}Y\text{—}SO_2T']^-M^+$ in which —T and T' are identical or different and comprise an organic radical bearing at least one active polymerization function such as an unsaturation or a ring that can be opened; —$M^+$ comprises an inorganic cation. —Y comprises N or CQ in which Q comprises H, CN, F, $SO_2R^3$, substituted or unsubstituted $C_{1-20}$ alkyl, substituted or unsubstituted $C_{1-20}$ aryl, substituted or un-substituted $C_{1-20}$ alkylene, in which the substituent comprises one or more halogens, and in which the chain comprises one or more F, $SO_2R$, aza, oxa, thia or dioxathia substituents; and —$R^3$ comprises F, substituted or unsubstituted $C_{1-20}$ alkyl, in which the substituted or unsubstituted $C_{1-20}$ aryl, substituted or unsubstituted $C_{1-20}$ alkylene, in which the substituent comprises one or more halogens.

12 Claims, No Drawings

POROUS OR NON-POROUS SUBSTRATE COATED WITH AN IMMOBILIZED POLYMERIC COMPOSITION HAVING SULFONYL GROUPS AND HYDROPHILIC FUNCTIONAL GROUPS AND PROCESS

CROSS-REFERENCE TO RELATED APPLICATIONS

This application is a 371 of PCT/US01/26720 filed Aug. 28, 2001 which claims priority benefit of U.S. Provisional Application Ser. No. 60/229,421, filed Aug. 31, 2000.

BACKGROUND OF THE INVENTION

1. Field of the Invention

This invention relates to a porous or non-porous substrate comprising a fluorine-containing polymer including a fluorocarbon polymer substrate having a surface with improved hydrophilic characteristics, comprising an immobilized fluorocarbon polymeric composition having hydrophilic functional groups, comprising sulfonyl groups and to a process for forming the substrate having the improved hydrophilic characteristics. More particularly, this invention relates to a porous or non-porous substrate comprising a fluorine-containing polymer including a fluorocarbon substrate having a surface with improved hydrophilic characteristics, comprising an immobilized fluorocarbon polymeric composition having hydrophilic functional groups comprising sulfonyl groups wherein the immobilized fluorocarbon polymeric composition is immobilized in situ on the porous or nonporous substrate.

2. Description of the Prior Art

Articles made of a fluorine-containing polymer including a perfluoro-carbon substrate are useful in a wide variety of environments due to the chemical inertness of the substrate. By the term "perfluorocarbon" as used herein is meant a polymer comprising one or more perfluorocarbon monomers including homopolymers, copolymers, terpolymers, polymer blends or the like. Examples of perfluorocarbons include polytetrafluoroethylene, fluorinated ethylene-propylene copolymer (FEP), polyvinylidene fluoride (PVDF) and perfluoroalkoxy polymer (PFA). These substrates are formed into a variety of shapes including non-porous films, beads, tubes, woven fibers, non-woven fibers, porous membranes, or the like.

Porous membrane filters are utilized in a wide variety of environments to separate materials within a fluid stream. Membranes are formed from a solid polymeric matrix and have highly precisely controlled and measurable porosity, pore size and thickness. In use, the membrane filters generally are incorporated into a device such as a cartridge, which in turn, is adapted to be inserted within a fluid stream to effect removal of particles, microorganisms or a solute from liquids and gases.

To be useful, membrane filters must be resistant to the fluid being filtered so that they maintains their strength, porosity, chemical integrity and cleanliness. In addition, membrane filters must remain wetted with the process fluid in order to maintain filtration efficiency. Perfluorocarbon-based membrane filters made from fluorine-containing polymers such as polytetrafluoroethylene, FEP or PFA are commonly utilized in these applications. Fluorine-containing polymers are well known for their chemical inertness, or excellent resistance to chemical attack. One disadvantage of fluorine-containing polymers is that they are hydrophobic and therefore membranes made from such polymers are difficult to wet or to remain wet with aqueous fluids or other fluids which have a tendency to outgas. For example, in the manufacture of microelectronic circuits, membrane filters are used extensively to purify various outgassing process fluids to prevent contaminants from causing circuit failures. Thus it would be desirable to provide a membrane filter having improved hydrophilic properties, which does not dewet during filtration in order to retain filtration efficiency.

Dewetting of a fluorine-containing polymeric surface also is a problem with a non-porous surface such as a hollow tube wherein the formation of gases therein restricts or prevents the controlled flow of an outgassing liquid therein.

When modifying a porous membrane surface for filtration applications, it is essential that the surface modification to impart improved hydrophilic characteristics be effected while maintaining desired fluid flow properties through the modified membrane. Thus, the membrane having its surface modified should retain sufficient porosity to permit its use as a filtration member. Accordingly the amount of surface modifying composition applied to the membrane surface must be controlled in order to retain porosity of the modified membrane. In contrast, when modifying a porous membrane for non-filtration applications such as in ion-exchange applications including electrodialysis, electrodeionization, fuel cells or the like, complete blockage of the membrane pores with the surface modifying composition is not a problem.

It has been proposed in U.S. Pat. No. 5,928,792 which is incorporated herein by reference to provide a process for modifying a surface of a porous membrane such as a perfluorocarbon membrane with a bound perfluorocarbon copolymer composition to render the entire surface non-dewetting.

PCT application WO 99/38897 discloses cross-linked sulfonated polymers and the process for preparing them.

U.S. Pat. No. 4,470,859 to Benezra et al, discloses a process for modifying the surfaces of microporous substrates formed of a fluorocarbon such as polytetrafluoroethylene, with a coating of an uncross-linked perfluorocarbon copolymer composition including hydrophilic functional groups copolymer from a solution of the pefluorocarbon copolymer composition to render the surface of the membrane more water wettable. The perfluorocarbon copolymer composition is dissolved in a nonaqueous solvent at elevated temperature. The membrane then is immersed into the solution which, in turn, is placed into a vacuum chamber. The pressure within the chamber then is reduced such as to approximately 150 millimeters of mercury (absolute) to remove air from within the filter. Thereafter, the pressure within the chamber is quickly returned to atmospheric pressure. This coating process is repeated to ensure, what is described by Benezra et al., complete solution penetration into the pores of the membrane. By proceeding in this manner, the membrane surfaces and the interior walls defining the interstices within the membrane are coated with the perfluorocarbon copolymer composition. Following the coating step, the solvent is removed by evaporation using heat and vacuum, or the solvated perfluorocarbon copolymer composition is precipitated with a substance in which the perfluorocarbon copolymer composition is effectively insoluble. The solvents utilized to form the solution include halocarbon oil, perfluorooctanoic acid, decafluorobiphenyl, N-butylacetamide, and N,N-dimethylacetamide. Subsequent to modifying the membrane surface, Benezra et al, teaches avoiding the use of a fluid containing a solvent for the modifying perfluorocarbon polymer composition on the membrane surface. Benezra et al. also disclose that alcohol solutions for the perfluorocarbon polymer composition should be avoided.

U.S. Pat. No. 4,902,308 to Mallouk et al, also describes a process for modifying the surface of a porous, expanded polytetrafluoroethylene membrane with a perfluorocation exchange polymer from an organic solution of the polymer. Mallouk et al, also teaches that contact of the surface modified membrane with fluids containing a solvent for the polymer also should be avoided.

U.S. Pat. Nos. 4,259,226 and 4,327,010 disclose modifying a porous membrane surface with a fluorinated polymer having carboxylic acid salt groups. No process steps are disclosed for controlling extractables from the membrane or for controlling the extent of binding of the modifying composition to the membrane surface.

U.S. Pat. Nos. 5,183,545 and 5,094,895 disclose a process for making a multilayer, composite, porous diaphragm from a porous, multilayer, expanded polytetrafluoroethylene substrate having its surface modified with an uncross-linked perfluoro ion exchange polymer composition. The modifying polymer composition can contain a surfactant and may contain excess modifying composition, both of which are sources of undesirable extractables.

U.S. Pat. No. 5,874,616 to Howells et al discloses a process for making linear polymeric bis(fluoroalkylenesulfonyl)imides by reacting a difunctional fluoroalkylene sulfonamide compound with a difunctional fluoroalkylene sulfonyl halide compound. Since this process relies on the use of low molecular weight reactants to produce the polymer, it is difficult to control the molecular weight distribution of the final linear polymeric composition and therefore it is undesirable. In addition, the linear polymeric bis(fluoroalkylenesulfonyl)imides are not cross-linked.

U.S. Pat. No. 5,463,005 to Desmarteau discloses a process for forming a copolymer of tetrafluoroethylene (TFE) and a sulfonimide-containing unsaturated monomer wherein the monomer is derived from a sulfonimide-containing reagent. Since TFE is a toxic reagent, its use is undesirable. In addition, since this process relies on the use of low molecular weight unsaturated monomers, it is difficult to control the molecular weight distribution of the final polymeric composition.

It has been proposed by Shimazo in J. Electroanal. Chem. 258 (1998) pp. 49–59 to cross-link a perfluorocarbon copolymer composition such as Nafion™ films with radio frequency plasma. Cross-linking with a plasma is effected without the introduction of cross-linking groups. Cross-linking is effected through a bond linking two polymer chains. It has been proposed by Greso et al in POLYMER vol. 38 No. 6 (1997), pp. 1345–1356 to cross-link a perfluorocarbon copolymer composition such as Nafion™ films via Si—O—Si bridges. This process is undesirable since the product contains a bound inorganic phase, which is chemically unstable.

It has been proposed by Covitch et al in Polymer Science and Technology Vol. 16, pp. 257–267 (1982) to cross-link a perfluorocarbon copolymer composition such as Nafion™ films with ethylenediamine and heat. This process is undesirable since the product contains a non-fluorinated ethylene portion, which is chemically unstable.

International Patent application No. PCT/CA99/00083 discloses polymers formed from fluorinated polymerizable difunctional monomers containing a sulfonyl group. International Patent application PCT/CA99/38897 discloses a fluorinated cross-linked polymeric compositions containing sulfonyl groups.

Accordingly, it would be desirable to provide a porous membrane formed from a fluorine-containing polymer having a surface with improved hydrophilic characteristics suitable for filtration applications. Such a porous membrane would be chemically and thermally stable and have a surface sufficiently hydrophilic to enable filtration while avoiding dewetting. In addition, it would be desirable to provide a non-porous membrane formed from an initially porous membrane formed from a fluorine-containing polymer having its pores filled with a fluorocarbon polymeric composition having hydrophilic functional groups. Such a non-porous membrane would be chemically and thermally stable and would permit the transport of ionic species therethrough. Furthermore, it would be desirable to provide a surface modified article formed from a non-porous fluorine-containing polymeric substrate having its surface modified with a fluorocarbon polymeric composition having hydrophilic functional groups. Such a non-porous article would be useful for processing outgassing liquids while avoiding dewetting of the surface.

SUMMARY OF THE INVENTION

This invention provides a porous or non-porous membrane or article formed from a fluorine-containing polymer substrate having its surface modified with an immobilized, such as by crosslinking and/or grafting, fluorocarbon, preferably perfluorinated, polymeric composition having hydrophilic functional groups to provide a surface with improved hydrophilic characteristics as compared to the unmodified substrate. By the phrase "improved hydrophilic characteristics" is meant that the product having the modified surface is non-dewetting after being wet with an aqueous fluid or is directly wetted by an aqueous fluid. The fluorine-containing polymer substrate can be a porous membrane or can be a non-porous article in any desired configuration such as a fiber, a woven or non-woven fabric formed from fibers, a mesh, a tube, a flat sheet, a corrugated sheet, a conduit, beads, rods or the like.

In one embodiment, this invention provides a surface comprising an immobilized perfluorocarbon polymeric composition, which is immobilized such as by crosslinking and/or grafting with at least one monomer having hydrophilic functional groups. These immobilized perfluorocarbon polymeric compositions are formed from chemically stable monomers in that they are fluorinated and are immobilized with fluorinated linking moieties, which are stable against degradation by virtue of contact with highly reactive reagents such as liquid compositions containing a base such as ammonium hydroxide, an oxidizer such as hydrogen peroxide or ozone and water, having a pH greater than about 9 such as special cleaning (SC) solutions, for example SC1 used during the manufacture of electronic components. In contrast, cross-linking moieties containing non-fluorinated organic groups become degraded upon contact with these reagents and these chemical cross-links are destroyed so that the cross-linked polymer loses its original degree of cross-linking.

In one aspect of this invention, the surface-modifying composition comprising a cross-linked and/or grafted fluorocarbon, such as perfluorocarbon, polymeric composition having hydrophilic functional groups derived from at least one monomer having the formula:

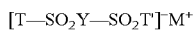

in which
- T and T' are identical or different and comprise an organic radical bearing at least one active polymerization function such as an unsaturation or a ring that can be opened;
- $M^+$ comprises an inorganic or organic cation.
- Y comprises N or CQ in which Q comprises H, CN, F, $SO_2R^3$, substituted or unsubstituted $C_{1-20}$ alky, substituted or unsubstituted $C_{1-20}$ aryl, substituted or un-substituted $C_{1-20}$ alkylene, in which the substituent comprises one or more halogens, and in which the chain comprises one or more F, $SO_2R$, aza, oxa, thia or dioxathia substituents; and
- $R^3$ comprises F, substituted or unsubstituted $C_{1-20}$ alkyl, in which the substituted or unsubstituted $C_{1-20}$ aryl, substituted or unsubstituted $C_{1-20}$ alkylene, in which the substituent comprises one or more halogens.

In one mode of embodiment, $M^+$ comprises a proton, the cation of a metal such as an alkali metal, an alkaline-earth metal, a rare-earth or a transition metal; an organometallic cation such as a metallocene, an arenemetallocene, an alkylsilyl, an alkylgermanyl or an alkyltin; or an organic cation optionally substituted by one or more organic radicals. Examples of preferential organic cations include an R"O$^+$ (onium) group, NR"$^+$ (ammonium)$_1$ R"C(NHR")$_2^+$ (amidinium), C(NHR")$_3^+$ (guanidinium), $C_5R"N^+$ (pyridinium) $C_3R"N_2^+$ (imidazalium), $C_2R"N_3^+$ (triazolium), $C_3R"N_2^+$ (imidazolinium), SR"$^+$ (sulfonium), PR"$^+$ (phosphonium), IR"$^+$ (iodonium), $(C_6R")_3C^+$ (carbonium), in which R" comprises:

the proton, alkyl, alkenyl, oxaalkyl, oxaalkenyl, azaalkyl, azaalkenyl, thiaalkyl, thiaalkenyl, dialkylazo, silaalkyl radicals, optionally hydrolyzable; silaalkenyl radicals, optionally hydrolyzable; said radicals able to be linear, branched, or cyclic and comprising 1 to 18 carbon atoms;

cyclic or heterocyclic aliphatic radicals of 4 to 26 carbon atoms, optionally comprising at least one side chain containing one or more heteroatoms such as nitrogen, oxygen or sulfur;

aryls, arylalkyls, alkylaryls and alkenylaryls of 5 to 26 atoms, optionally containing one or more heteroatoms in the aromatic nucleus or in a substituent.

groups comprising several aromatic or heterocyclic nuclei; condensed or not, optionally containing one or more nitrogen, oxygen, sulfur or phosphorus atoms; and when an organic cation has at least two R" radicals different from H, these radicals can form together an aromatic or non-aromatic ring, optionally surrounding the center bearing the cationic charge.

The monomer or mixture of monomers can also be copolymerized/cross-linked/grafted with at least one monofunctional monomer, preferably of the formula $(T-SO_3)^- M^+$ or $(T-SO_2-Y-SO_2W)^{31} M^+$ in which T, Y and M are defined above and W is a monovalent organic alkyl, alkenyl, aryl, alkylaryl, arylalkyl radical of 1–12 carbon atoms, optionally bearing one or more oxa, aza or thia substituents. The surface modifying polymer is formed by coating the substrate with at least one of the above monomers under conditions to effect polymerization and cross-linking/grafting of the monomer. When the monomer is polyfunctional, it can be cross-linked by adding a polymerization initiator followed by heat thereto or by exposing it to ionizing radiation such as electron beam radiation, ultraviolet light, plasma energy, Infrared radiation, gamma radiation, thermal energy or the like. When the monomer is monofunctional, a polyfunctional monomer is added to effect cross-liking. The bulk properties of the porous or nonporous substrate include inertness to most organic solvents, inertness to many chemical reagents, good tensile strength and ductility. The composite membranes of this invention can be used in filtration processes which are aqueous or which utilize organic solvents as in the pharmaceutical industry and with liquids containing concentrated acids as is commonly encountered in the electronic industries or in electrolysis applications such as in fuel cells.

DESCRIPTION OF THE SPECIFIC EMBODIMENTS

Representative suitable fluorine-containing polymers useful for forming the porous or solid substrates for this invention include polytetrafluoroethylene (PTFE), perfluoroalkoxy polymers (PFA), fluorinated ethylene-propylene copolymers (FEP), ethylene-tetrafluoroethylene copolymers (ETFE), polyvinylidene fluoride (PVDF), polychlorotrifluoroethylene (PCTFE), polyvinyl fluoride (PVF), ethylene-chlorotrifluoroethylene copolymer (ECTFE), or the like. Other suitable fluorine-containing polymers useful for forming the substrates of this invention include functionalized polymers such as fluorocarbon polymers containing ionic groups, for example sulfonic acid groups, sulfonamide groups, sulfonimide groups, sulfonyl methide groups, sulfonyl methane groups, amide groups, imide groups or the like or the non-ionic precursors of such polymers.

Exemplary fluorocarbon, preferably perfluorinated, monomers from which the surface-modifying cross-linked fluorocarbon polymeric compositions having hydrophilic functional groups include perfluoro-di(vinylethers) bearing highly dissociated imide of sulfone functions, such as di(sulfonylmethane), sulfonimide or tri(sulfonylnethane), as a base for the formation of cross-linked surface-modifying polymeric composition.

In accordance with this invention a porous or non-porous substrate or article having the desired properties is directly applied in at least a portion of its surface area with a crosslinked polymerized derived from at least one monomer having hydrophilic functional groups. The fluorocarbon polymeric composition is deposited on the surfaces of the porous or non-porous substrate by graft polymerization of the monomers and/or by deposition of the cross-linked polymer. The monomer is multifunctional and cross-linking/grafting/polymerization of the monomer(s) can be effected by adding a polymerization initiator thereto and exposing the resulting mixture to ionizing radiation or heat. Alternatively, cross-linking/grafting/polymerization can be effected by exposing the monomers to radiation energy such as ultraviolet light (UV), electron beam, heat, gamma radiationor the like. When utilizing a porous membrane as a porous substrate, the average pore size is between about 0.001 and 10 microns and more usually between about 0.01 and 5.0 microns. The polymerization/grafting/cross-linking of the polymerizable monomers to the substrate by grafting and/or deposition must be effected so that at least a portion of the surface of the substrate is modified with a cross-linked/grafted, or otherwise immobilized polymer. Therefore, in a first step, the substrate is wet with a solvent composition that does not significantly swell or dissolve the substrate and which wets the surface of the substrate such as an organic solvent or a mixture of water and an organic solvent. Suitable water-solvent compositions for this purpose include methanol/water, ethanol/water, acetone/water, tetrahydrofuran/water or the like. The purpose of this wetting step is to assure that the monomer composition subsequently contacted with the substrate wets the surface of the substrate. This preliminary wetting step can be eliminated when the reagent bath described below itself functions to wet the surface of the substrate. This can be effected when the reagent bath contains a high concentration of organic reactants, for example 15% by weight or higher.

Subsequent to wetting the substrate, the radical polymerizable monomer described below and a polymerization initiator in a solvent is contacted with the substrate and exposed to cross-linking/graftin/polymerization conditions such as thermal energy at a temperature of at least about 30° C. for a time of at least about 30 seconds, or UV light for at least about 1 second to effect polymerization of the monomer and deposition of the substrate with the cross-linked polymer. Alternatively, other sources of ionizing radiation can be used. When this is used, a polymerization initiator is not required although it can be present.

Examples of preferential monomers to form the cross-linked/grafted polymer include:

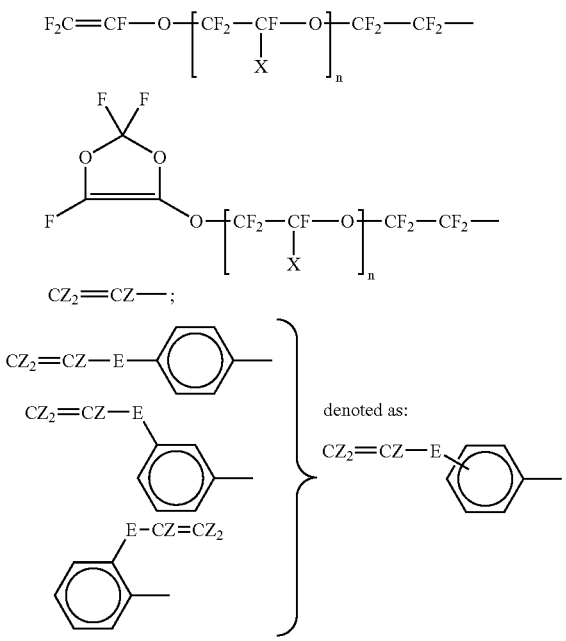

in which
- —X represents F, Cl, or $CF_3$;
- —n varies between 0 and 10 inclusively;
- —E is absent, O, S or $SO_2$; and
- —Z is F or H.

The monomers useful as surface modifiers in the present invention can be obtained by different processes. For example, monomers of the imide type are obtained in the following manner:

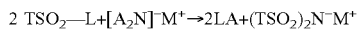

or even

in which L is a labile group, for example, a halogen, a thiocyanate or an electrophilic group containing at least one heteroatom, such as N-imidazolyl, N-triazolyl, or $R—SO_2O—$ in which R is $C_{1-20}$ alkyl or $C_{1-20}$ alkylene, substituted or unsubstituted, in which the substituent is one or more halogens; and in which the chain includes one or more substituents chosen from among aza, oxa, thia, or dioxathia; and A is the element or the fraction of the element corresponding to the cation $M^+$, and comprising hydrogen, a trialkylsilyl group, a trialkyltin or tetraalkyl group, in which the alkyl group comprises 1 to 6 carbon atoms.

In the same way, the monomers composed of carbons, i.e., when Y=CQ are obtained from similar reactions:

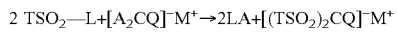

in which L, T, Q, A and M are as defined above.

The tert-alkyl radical in definition A above is advantageous since it constitutes the precursor of an alkene being eliminated from the reaction medium and of a proton. For example, when it involves a tert-butyl, the following reaction is observed:

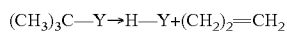

The trialkylsilyl group is advantageous when the labile group L is fluorine, given the high formation enthalpy of the Si—F bond.

When A is a proton or a proton precursor, such as a tert-alkyl radical, it is advantageous to conduct the reaction in the presence of an obstructed base, for example a tertiary base. Examples of such bases are triethylamine, diisopropylamine, quinuclidinol, 1,4-diazobicyclo[2.2.2]octane (DABCO), pyridine, alkylpyridines, dialkylaminopyridines, N-alkylimidazoles, imidazo[1,1-a]pyridine, amidines such as 1,5-diazabicyclo[4.3.0]non-5-ene (DBN) or 1,8-diazabicyclo[5.4.0]undec-7-ene (DBU), guanidines such as tetramethylguanidine, 1,3,4,7,8-hexahydro-1-methyl-2H-pyrinido-[1,2-a]pyrimidine (HPP).

In several cases, the potassium salt of these monomers is insoluble or very poorly soluble in water, and can be precipitated therein from more soluble salts, i.e., $H^+$, $Li^+$ or $Na^+$ salts, and then purified by recrystallization. Recrystallization can be conducted in water, alone or in mixture with a miscible solvent, such as acetonitrile, dioxane, acetone or tetrahydrofuran (THF).

Dialkylammonium salts, particularly tetraalkylammonium or imidazolium salts, are usually insoluble in water and can therefore be extracted by means of various solvents, preferably halogenated solvents, such as dichloromethane, dichloroethane, trichloroethane, 1,1,1,2-tetrafluoroethane, etc.

It is understood that any function of the monomer able to interfere with the reaction leading to the formation of the $SO_2—Y—SO_2$ bond is protected beforehand according to protection techniques well known to the person skilled in the art. For example, perfluorovinyl ether groups can be halogenated, in particular chlorinated or brominated, to give rise to a non-reactive perhalo ether. The perfluorovinyl ether is possibly regenerated according to different processes well known to the person skilled in the art, for example, either by an electrochemical reaction, or with a reduction agent such as zinc powder, a bronze zinc-copper alloy, or tetrakis(dimethylamino)ethylene.

The following bifunctional monomers illustrate preferential monomers forming the surface modifiers cross-linked polymers of the invention.

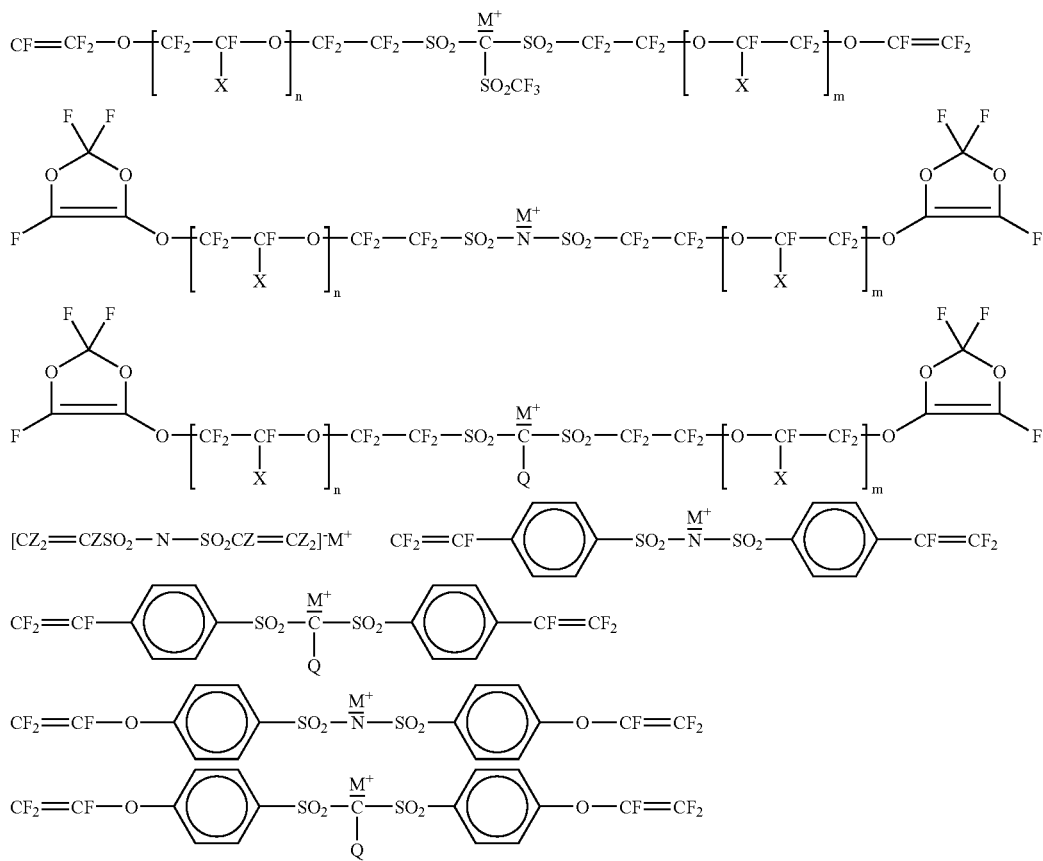

in which $M^+$, Z, Q, X and Y are such as defined previously, and n and m are identical or different and vary between 0 and 10 inclusively.

The cross-linked/grafted surface modifying polymers are obtained by homo- or copolymerization/crosslinking/grafting of the multifunctional monomers of the present invention. For the copolymers/grafts, the comonomers are advantageously chosen from among the salts of monofunctional monomers of the general formula:

[T'—SO$_3$]$^-$M$^+$ or

[T'SO$_2$—Y—SO$_2$—W]$^-$M$^+$ in which T', Y, M$^+$ are as defined previously, and W has the same definition as Q.

Examples of preferential monofunctional monomers of the invention for a copolymerization/graft include:

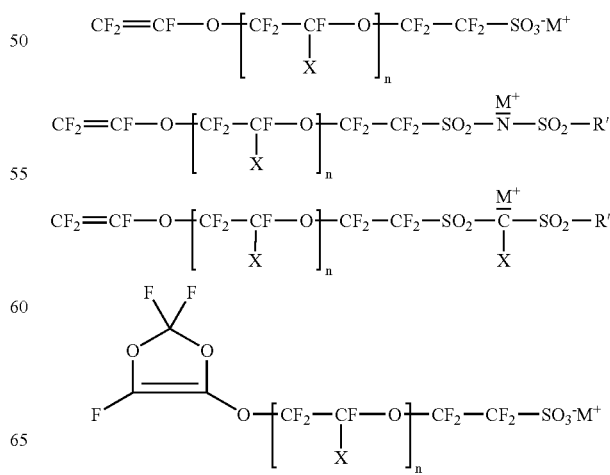

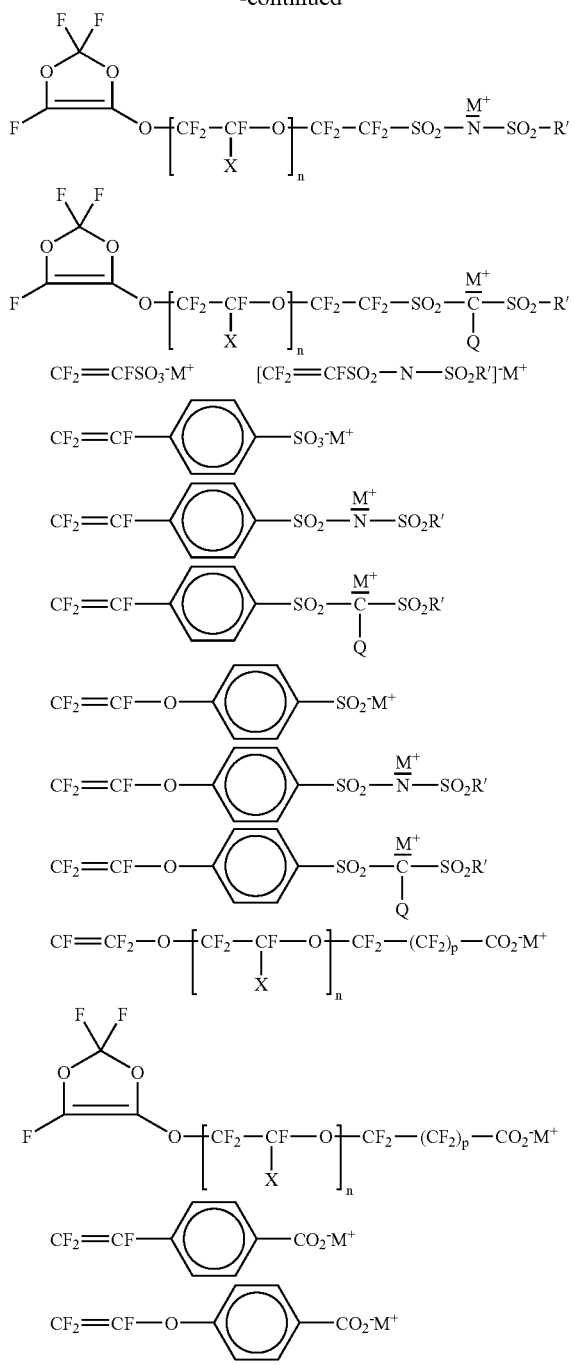

in which Q, M, O, X and n are as defined previously; R' is a monovalent organic radical comprising 1 to 12 atoms, preferably perfluorinated, possibly having one or more oxa, aza, thia or dioxathia substituents; and p is 1 or 2.

The particular solvent employed for the polymerizable monomer, will depend upon the particular monomer employed and upon the particular polymer substrate utilized. All that is necessary is that the monomer(s) dissolve in the solvent and that the solvent does not attack the substrate. Thus, the particular solvent system used will depend upon the monomer and substrate employed. Representative suitable solvents include water or organic solvents such as alcohols, esters, ethers, acetone or compatible aqueous mixtures thereof. Alternatively, the monomers can be polymerized/grafted/cross-linked in the absence of a solvent, particularly when the final product desired is of a non-porous nature.

Generally the polymerizable monomer is present in the reactant solution at a concentration between about 0.01% and about 100%, preferably between about 1% and about 15% based upon the weight of the monomer when the final product is desired to be porous. Higher concentrations are utilized when the final product is non-porous.

Reaction can be effected while the substrate is immersed in solution. However, this will result in the polymerization of the monomer(s) throughout the solution. It is preferred to saturate the porous membrane with the reactant solution and to effect reaction outside of the solution so that monomer is not wasted. Thus, the reaction can be conducted batchwise or continuously. When operating a continuous process, a sheet of porous membrane is saturated with the reactant solution and then transferred to a reaction zone where it is exposed to radiation energy such as heat, ultraviolet light or other ionizing radiation to effect the polymerization/grafting/cross-linking reaction. Representative suitable polymerization initiators which can be utilized include persulfates such as ammonium persulfate, benzophenone, benzoyl peroxide, azobisisobutyronitrile or the like.

What is claimed is:

1. An article formed from a substrate comprising a fluorine-containing polymer having its surface modified with an immobilized fluorocarbon polymeric composition having hydrophilic functional groups derived from at least one monomer of the formula:

$$[T-SO_2Y-SO_2T']M^+$$

wherein:

T and T' are identical or different and each comprise a perfluorinated organic radical bearing at least one active polymerization function;

$M^+$ comprises an inorganic or organic cation;

Y comprises N or CQ;

Q comprises H, CN, F, $SO_2R^3$, perfluorinated $C_{1-20}$ alkyl, perfluorinated $C_{1-20}$ aryl, or perfluorinated $C_{1-20}$ alkylene, and $R^3$ comprises perfluorinated $C_{1-20}$ alkyl, perfluorinated $C_{1-20}$ aryl, or perfluorinated $C_{1-20}$ alkylene.

2. The article of claim 1 wherein the immobilized fluorocarbon polymeric composition is cross-linked.

3. The article of claim 2, wherein said monomer comprises a perfluorinated di(vinyl ether).

4. The article of claim 1 wherein the immobilized fluorocarbon polymeric composition is grafted.

5. The article of claim 4 wherein said monomer comprises a perfluorinated di(vinyl ether).

6. The article of any one of claims 1, 2 and 4 wherein the substrate is non-porous and the article is non-porous.

7. The article of claim 6 wherein said monomer comprises a perfluorinated di(vinyl ether).

8. The article of claim 1 wherein the substrate is porous.

9. The article of claim 8 wherein said monomer comprises a perfluorinated di(vinyl ether).

10. The article of claim 1 wherein the substrate is non-porous.

11. The article of claim 10 wherein said monomer comprises a perfluorinated di(vinyl ether).

12. The article of claim 1 wherein said monomer comprises a perfluorinated di(vinyl ether).

* * * * *